Dec. 10, 1929. H. DIEBEL 1,738,526
WIND MOTOR AND VENTILATOR
Filed March 21, 1928  2 Sheets-Sheet 2
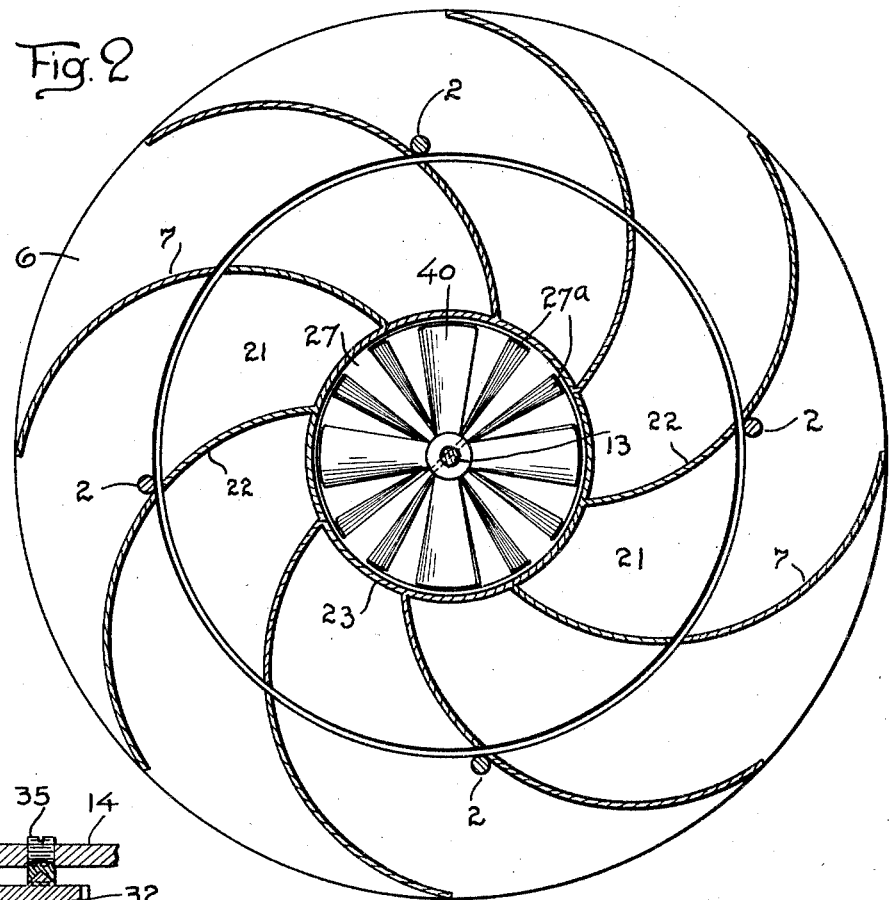
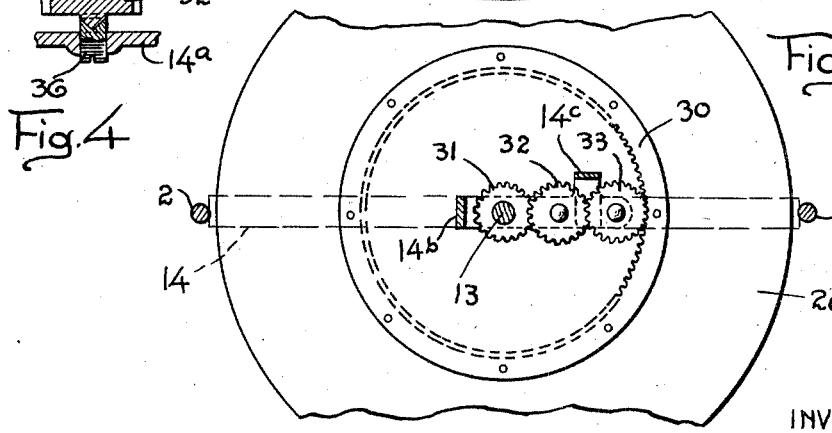
INVENTOR
Henry Diebel
BY
ATTORNEY Patented Dec. 10, 1929

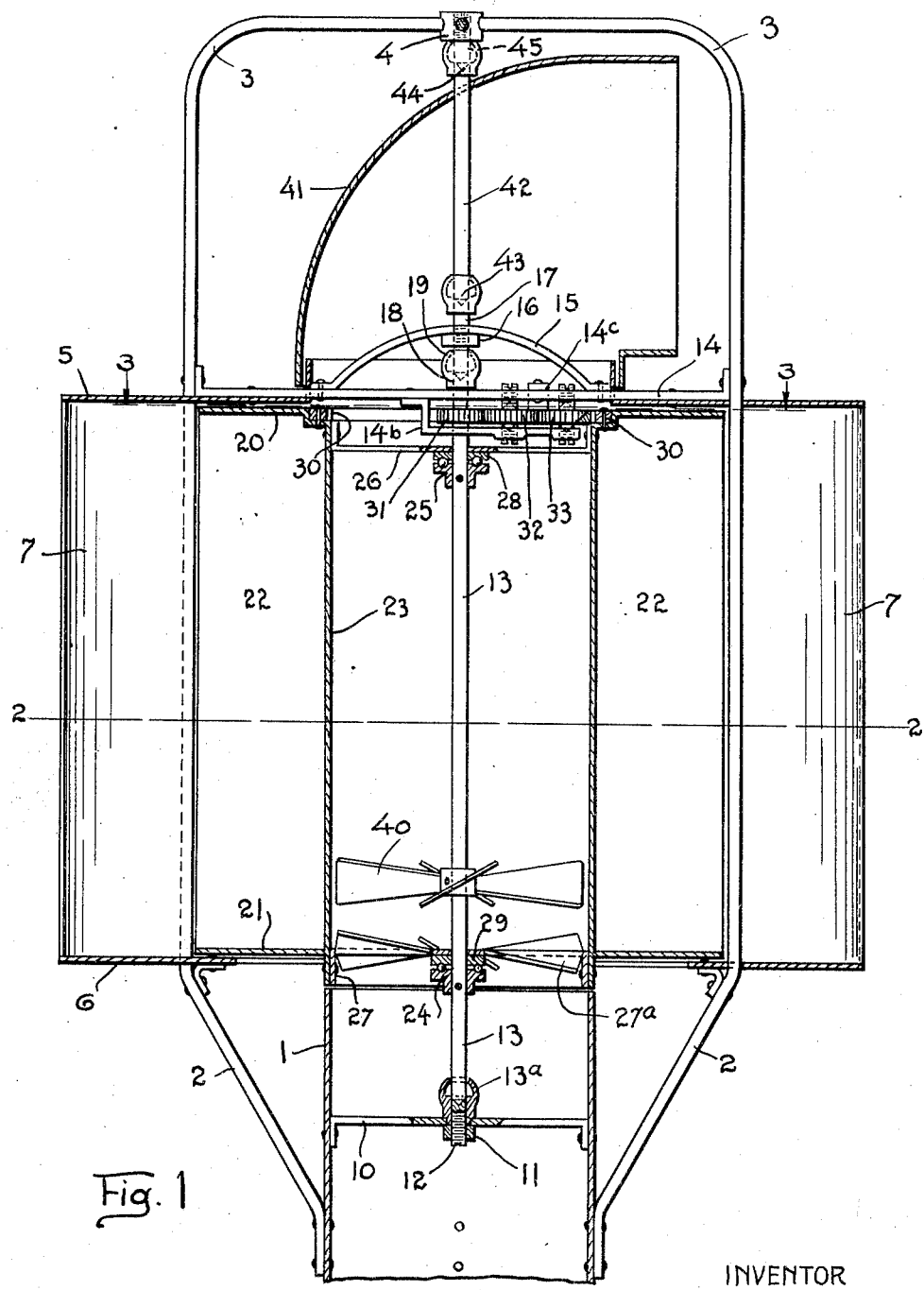

1,738,526

UNITED STATES PATENT OFFICE

HENRY DIEBEL, OF DETROIT, MICHIGAN, ASSIGNOR TO HOWIE COMPANY, INC., OF DETROIT, MICHIGAN, A CORPORATION OF MICHIGAN

WIND MOTOR AND VENTILATOR

Application filed March 21, 1928. Serial No. 263,237.

This invention relates to a ventilator, and has to do especially with a construction which involves a wind motor in conjunction with a ventilator for operating a ventilator fan.

An object of the invention is the provision of a ventilator construction wherein a relatively powerful wind motor is provided for operating a ventilating fan. The invention contemplates an arrangement wherein the fan may be driven at a speed relatively high as regard the speed of the wind motor, for the purpose of effecting efficient ventilating. It is appreciated that ventilators of this nature are not entirely new, but the present invention contemplates separate units, to wit: a wind driven motor and ventilating apparatus which are built into a single assembly and adapted to be placed upon a vent pipe. It is proposed to provide a simple assembly made up of a minimum number of parts and of simple construction capable of operation for a long period of time without involving frequent inspections or adjustments, and also an assembly wherein adjustments such as bearing adjustments, or the like can be quickly and easily made when and if desired.

In the accompanying drawings:

Fig. 1 is a vertical sectional view taken through the construction, showing the same mounted upon a vent pipe.

Fig. 2 is a sectional view taken on line 2—2 of Fig. 1, illustrating the arrangement of the wind motor and ventilating fan.

Fig. 3 is a section taken on line 3—3 of Fig. 1, illustrating the operable connections between the wind motor and the shaft upon which the ventilating fan is mounted.

Fig. 4 is an enlarged detail illustrating the preferred manner of mounting the pinions or gears in the gearing between the motor and the fan.

In the accompanying drawings, a section of a vent pipe is shown at 1. This section may be part of the assembly and adapted to be fitted upon a vent pipe of any suitable kind, as for instance, a vent pipe coming through the roof of a building. Secured to this pipe section 1 are stationary braces or brackets 2, preferably one at each side, which diverge outwardly from the vent pipe and then extend upwardly as shown, bend inwardly as at 3, and connect into a center piece 4. There may be four of these members or, there may be only two, which cross at the center location at the point referenced 4.

These supporting pieces carry a stationary construction which aids in directing wind currents into the movable part of the wind motor, and this stationary construction in reality forms a part of the wind motor. This stationary structure involves upper and lower disc-like rings 5 and 6, which carry vertically extending curved vanes 7.

Within the pipe 1 there is fixed a bracket 10 for carrying a bearing which supports the wind motor. This bearing may advantageously consist of an internally threaded nut-like member 11, and a screw threaded bearing member 12 provided with a recess for receiving a relatively pointed bearing end of a shaft 13. The bearing construction may include a covering 13$^a$ for retaining lubricant for the bearing and preventing escape of the lubricant.

This shaft extends upwardly through the assembly, and the frame construction is provided with a cross bracket 14 carrying a bearing supporting member 15. This bearing supporting member 15 is provided with an internally threaded nut-like member 16, in which is mounted a threaded member 17. The upper end of the shaft 13 and member 17 have an end to end socket like bearing connection 18 covered as at 19 for the purpose of retaining lubricant. It will thus be seen that by adjusting either one or both of the members 12 or 17 that the shaft 13 can be nicely adjusted between the end bearings.

The wind motor per se, takes the form of an upper disc 20 and lower disc 21 between which extend vertically disposed curved vanes 22. Running centrally through this wind motor is a pipe like formation 23 which surrounds the shaft 13 and which is in alignment with the pipe section 1, although not in contact therewith. Secured to the shaft 13 are thrust bearings 24 and 25, and the motor is provided with upper and lower brackets 26 and 27 having cooperating thrust bearing parts 28 and 29. Thus it will be seen that the wind motor section is carried by the shaft 13 through the medium of the thrust bearings. These thrust bearings are preferably of an anti-friction type as shown.

It will be seen from the above description that air currents which flow past the motor strike the stationary vanes or deflectors 7, and are directed inwardly of the motor and come in contact with the vanes 22 on the movable part of the wind motor. Thus the movable part of the wind motor is rotated on its supporting bearings.

Noting Fig. 3, it will be observed that the movable part of the wind motor is provided with an internal ring gear 30. Fixed to the shaft 13 is a gear 31 and interposed between the ring gear 30 and gear 31 are idlers 32 and 33. Preferably two idlers are used for the purpose of effecting rotational movement of the shaft 13 in a direction which is the same as the rotational movement of the wind-motor. For the purpose of supporting the idlers there is a secondary bracket 14$^a$ secured to the bracket 14. These brackets may be secured directly together at one end and at 14$^b$, and may be held together by means of a U-shaped bracket 14$^c$. Noting Fig. 4 the preferred form of mounting these pinions is shown. Here it will be noted that pinion 32 is provided with bearing points which fit into sockets of screw threaded adjusting bearing members 35 and 36. It will be appreciated how a nicety of adjustment can thus be had and how easy an adjustment for wear can be made from time to time. Suitable lock nuts or set screws for the bearing members can be provided if necessary.

It will thus be observed that this constitutes a step up gearing between the wind motor and the shaft so that the shaft 13 turns at a speed greater than the wind motor. This gearing ratio can be arranged to meet different conditions, but it has been found that a ratio in the neighborhood of 6 to 1 is satisfactory. A ventilating fan 40 is mounted on the shaft and this fan effects movement of air through the aligned pipes 1 and 23 upon rotation thereof. It may be desirable, and it is thought to be preferable, to make the bracket 27 of the movable part of the wind motor in the form of a disc which is stamped out to provide a plurality of blades 27$^a$. With this arrangement provision is had for setting up ventilating drafts by movement of the wind motor independent of the ventilating fan 40, so that the two fan devices, in a way, complement each other so as to set up an efficient ventilating draft. Also the upper bracket 26 may be similarly constructed if desired, although both constructions may be eliminated and ventilation accomplished solely by the fan 40.

Although there is provided by this invention, a forced draft for ventilating purposes, it is thought desirable to provide a hood for the discharge end of the vent pipe which is rotatably mounted so as to be adjusted by the action of the wind, and thus partake of the advantages of the suction type ventilating system. Inasmuch, however, as forced draft is provided, this hood will be generously calculated so as to not interfere with the forced draft and cause back pressure therein. Accordingly, a hood 41 is provided and this is mounted upon a shaft 42. This shaft has an end to end bearing as at 43 with the bearing member 17, and an end to end connection at 44 with a screw threaded adjustable bearing member 45. These bearings 43 and 44 may be, and preferably are, similar to the upper and lower bearings for the shaft 13, which have previously been described in detail.

In the operation, the movable part of the wind motor rotates to thus rotate the ventilating fan on the shaft 13. The shaft 13, of course, rotates at a higher rate of speed than the wind motor, and this differential of movement is taken care of by the thrust bearings between the two. The creation of the vent draft is aided by the blades 27$^a$ where this is provided. At the same time, the hood moves under the action of the wind, to locate the discharge end on the leeward side, thus taking advantage of a suction type vent, so that in reality, a forced pressure ventilating and suction ventilating are provided. After a period of time, should any of the bearings 12, 18, 43, and 44 need adjustment, the same can be accomplished by adjusting the several screw threaded bearing members. Of course, if an adjustment is made for the bearings in the shaft 13 which involves moving the bearing member 17, the bearing member 45 for the shaft 42 will have to be adjusted accordingly to properly adjust the bearings for the shaft 42.

It is contemplated to make the motor in sections for obtaining different sizes. For example, as shown in the drawings, one section is shown which consists of upper and lower disk-like plates with wind vanes between them. In order to make a larger motor, another unit can be placed on top of the one shown. Thus the capacity of the motor can be changed without extending the same radially but by adding one section on top of the other.

Claims:

1. A wind driven ventilating apparatus comprising in combination, a vent pipe, a wind motor mounted on the vent pipe, a shaft supported by the vent pipe substantially on the axial center thereof and supporting the wind motor, a conduit through the wind motor which is in substantial alignment with the vent pipe, reduction gearing between the wind motor and the shaft for rotating the vent fan at a speed greater than that of the wind motor, and a fan embodied directly in the wind motor positioned in the air conduit for aiding the ventilating fan on the shaft to set up air currents through the conduit.

2. A wind driven ventilating apparatus, comprising in combination, a vent pipe, frame work secured directly to the vent pipe and extending above the vent pipe, means providing a bearing within the vent pipe, a cross support on the frame affording a second bearing, a shaft rotatably journaled in these bearings and disposed on the axial center of the vent pipe, a wind driven motor supported on this shaft, a ventilating fan on the shaft, an air conduit extending through the motor which is in substantial alignment with the vent pipe, a second bearing supported by the cross support on the frame, and a bearing supported at the end of the frame, a shaft journaled between these last mentioned bearings, and a hood carried by this last mentioned shaft which is in alignment with the air conduit in the motor and which is adapted to swing in its mounting in accordance with wind direction whereby a ventilating draft is effected both by the forcing action of the fan and by suction action effected by the hood.

3. A wind driven ventilating apparatus, comprising in combination, a vent pipe, a frame work secured directly to the vent pipe and extending above the vent pipe, means providing a bearing within the vent pipe, a cross support on the frame affording a second bearing, a shaft rotatably journaled in these bearings and disposed on the axial center of the vent pipe, a wind driven motor supported on this shaft, a ventilating fan on the shaft, an air conduit extending through the motor which is in substantial alignment with the vent pipe, a second shaft journaled in the frame, and a hood carried by this last mentioned shaft which is in alignment with the air conduit in the motor and which is adapted to swing in its mounting in accordance with wind direction whereby a ventilating draft is effected both by the forcing action of the fan and by suction action of the hood, and means supported stationarily by the frame and around said motor and having a plurality of wind deflecting vanes for directing air currents into the wind motor.

In testimony whereof I affix my signature.

HENRY DIEBEL.